Dec. 9, 1941.     T. B. MONTGOMERY     2,265,952
PRIME MOVER CONTROL SYSTEM
Filed April 13, 1939
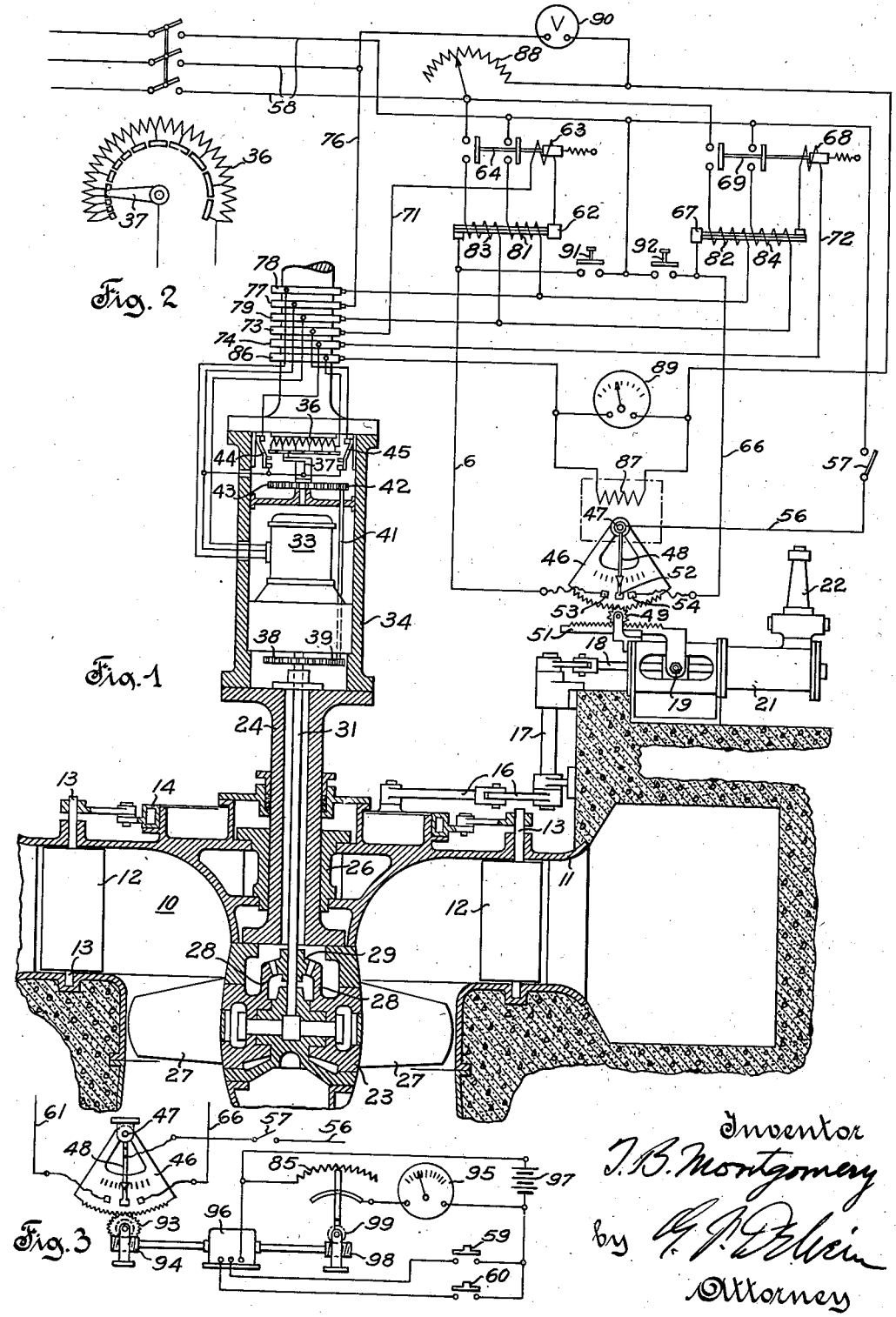

Patented Dec. 9, 1941

2,265,952

UNITED STATES PATENT OFFICE 2,265,952

PRIME MOVER CONTROL SYSTEM

Terryl B. Montgomery, Wauwatosa, Wis., assignor to Allis-Chalmers Manufacturing Company, Milwaukee, Wis., a corporation of Delaware Application April 13, 1939, Serial No. 267,546

13 Claims. (Cl. 253—143)

This invention relates to systems for controlling the operation of hydraulic turbines of the adjustable vane propeller type and more particularly to electrically operative means for varying and for indicating the angular position of the runner vanes relative to the position of the guide vanes forming the gate which controls the admission of fluid to the turbine runner.

In the operation of a hydraulic turbine with adjustable runner vanes, a definite relationship must be maintained between the angular position of the runner vanes and the angular position of the guide or gate vanes to obtain the most efficient operation of the turbine at all settings. The above mentioned relationship of angular positions, however, is not constant over the entire range of turbine regulation from no load to full load. If the load on the turbine changes from half load to full load, the gate vanes move only a very small distance but the runner vanes must be tilted by a relatively large amount to maintain maximum efficiency of the turbine. If the load on the turbine changes from half load to no load, the gate vanes will move a relatively large amount but the runner vanes will be tilted only a small amount to maintain maximum turbine efficiency. The proper relation between gate vane movement and runner vane movement is best obtained by the use of electrical means responsive to the movement of the gate and capable of controlling the mechanism controlling the position of the runner vanes.

It is therefore an object of the present invention to provide a hydraulic turbine of the adjustable vane propeller type with electrical means by means of which the operating mechanism for the runner vanes is controlled by the gate vane operating mechanism.

Another object of the present invention is to provide adjustable vane hydraulic turbines with electrical means for controlling the operation of an electric motor actuated runner vane adjusting mechanism in which adjustable electrical means are provided to vary the ratio between the runner vane position and the gate vane position.

Another object of the present invention is to provide an electrical control system for hydraulic turbines of the adjustable vane propeller type which includes means dependent on the governor position for adjusting the position of the runner vane position for disconnecting the runner vane adjusting means.

Another object of the present invention is to provide an electrical control system for hydraulic turbines of the adjustable vane propeller type in which electrical means may control either or both local and remote recording means for registering the angular position of the runner vane relative to the angular position of the gate vanes.

A further object of the present invention is to provide a hydraulic turbine of the adjustable vane propeller type with electrical means for varying the relationship between the runner vane position and the gate vane position and for restoring such system to its initial condition after each operation thereof.

Objects and advantages other than those above set forth will be apparent from the following description, when read in connection with the accompanying drawing in which:

Fig. 1 is a diagrammatic illustration of the electrical control system for hydraulic turbines embodying the present invention;

Fig. 2 is a diagrammatic view of a rheostat forming a portion of the control system and illustrating the construction of such rheostat to obtain varying relations between the gate and runner vanes of a hydraulic turbine of the adjustable vane propeller type; and Fig. 3 is a diagrammatic view of a modification of a portion of the system shown in Fig. 1 and which is adapted particularly for remote operation of the control system.

Referring to the drawing by characters of reference, the reference numeral 10 designates a turbine generally with a casing 11 connected with a source of fluid pressure and forming a peripheral water inlet in which are mounted a series of movable vanes forming a gate 12. The gate or guide vanes are severally mounted on stems 13 journaled in the top and bottom portions of the casing 11. The upper ends of the stems extend through the casing to provide for connection with a ring 14 which is movable to shift all of the gate vanes to different angular positions to control the flow of water to the turbine. The shifting ring 14 is connected by a suitable linkage 16 to a vertical shaft 17 connected at the upper end thereof with a connecting rod 18 pivoted to a crosshead 19 of a servomotor 21 operated by fluid pressure. The supply of fluid pressure is controlled by a speed responsive governor 22 and the gate vanes 12 are therefore adjusted dependent on the speed and hence on the load of the turbine. The turbine casing encloses a runner comprising a hub 23 secured to the lower end of a hollow shaft 24 journaled in a suitable bearing 26 which constitutes a part of the turbine casing structure. The hub of the runner has mounted therein a plurality of radially extending vanes 27, provided at the inner ends thereof with gear segments 28 which mesh with a pinion 29 keyed to a shaft 31 extending through the bore of the main drive shaft 24. The upper end of the shaft 31 is movably connected with a speed reducing gear which is driven by an electric motor 33.

An enlarged hollow casing 34 flanged at both ends and secured between complementary flanges on the main drive shaft 24 forms a housing for a speed reducer, the electric motor 33 and other mechanism which is necessary for the intended operation of the structure shown. A rheostat 36 is mounted in insulated relation within the casing 34 and is controlled by a contact formed as an arm 37 which is geared to the shaft 31 by means of gears 38 and 39 and connected by shaft 41 with gears 42 and 43. The rheostat arm 37 also controls the operation of a pair of limit switches 44 and 45 which are provided to prevent overtraveling the limit of the runner vane position.

The operation of the runner vane adjusting motor 33 is controlled by a device comprising a gear segment 46 pivoted at 47 (and shown as graduated in tenths of its total movement) to cooperate with a pointer 48 also pivoted at 47 and indicating the position of the gate vanes 12. The gear segment 46 meshes with a pinion 49 rotatably mounted on the servomotor 21 and engaging with a rack 51 mounted on the servomotor crosshead 19. The pointer 48 is provided with a contact 52 formed to be engageable with contacts 53 or 54 mounted in insulated relation on the gear segment on opposite sides of the pointer. Contact 52 is connected through a conductor 56 containing a switch 57 with one phase of an auxiliary or so-called house power line 58. Contactor 53 is connected through a conductor 61 with a thermal overload relay 62, herein shown as being of the bimetallic type, and through the relay with the operating coil 63 of a switch 64 which, when closed, completes a circuit by which motor 33 is energized to adjust the runner vanes 27 to a steep tilt position. Contact 54 is connected through a conductor 66 with a thermal overload relay 67 and with the operating coil 68 of a switch 69 which, when closed, completes a circuit by which the motor 33 is energized to adjust the runner vanes 27 to a flat position. The switch operating coils 63 and 68 are connected respectively by conductors 71 and 72 with brushes acting on slip rings 73 and 74 mounted on the turbine shaft and connected with the limit switches 45 and 44, respectively. Another phase of the auxiliary line 58 is connected through conductor 76 with slip ring 77 connecting with the other side of the limit switches, and with one of the conductors to the motor 33. The other conductors to the motor 33 are connected with slip rings 78 and 79, respectively, slip ring 78 being connected with one phase of line 58 through winding 81 of overload relay 62 and a contact of switch 64 and also through winding 82 of overload relay 67 and a contact of switch 69, and slip ring 79 being connected with another phase of line 58 through winding 83 of relay 62 and a contact of switch 64 and through the winding 84 of relay 67 and a contact of switch 69.

The rheostat is connected through a slip ring 86 with a winding 87 acting on the pointer 48 and through a manually adjustable rheostat 88 with one phase of line 58. The winding 87 acts on the pointer 48 to restore the pointer to midposition between contacts 53 and 54 after each adjusting movement of the runner vanes and at a rate dependent on the adjustment of rheostat 88. During normal operation, pointer 48 occupies a neutral or midposition between contacts 53 and 54 and thus allows the governor 22 to regulate the opening of the gate 12 by operation of the servomotor 21, within predetermined limits without affecting the angular adjustment of the runner vanes 27 which eliminates unnecessary controlling operation of the unit.

As shown in Fig. 2 particularly, the rheostat 36 is divided into a series of steps gradually changing in resistance value from one end of the rheostat to the other. A varying rotation of the motor 33 is thus obtained dependent on the position to which the runner vanes 27 are tilted, which varying rotation gives a changing relation between the gate vane and runner vane positions and produces the most effective relation, at all settings, of the two sets of vanes. It will be understood that the values of the several resistance steps of the turbine will be calculated to give the exact motor rotation required for each setting of the gate vanes to obtain the most efficient cooperation between the gate and runner vanes.

During operation of the turbine unit, the servomotor 21 is controlled by the governor 22 and moves the gate 12 toward open or closed position to vary the flow of water to the runner dependent on the load on the turbine. If, for example, the governor 22 causes the gate 12 to move toward open position, crosshead 19 and the rack 51 move a small distance toward the left. Pinion 49 therefore moves in a clockwise direction and the gear segment 46 with its spaced contacts 53 and 54 moves in a counterclockwise direction. Slight movements of the governor consequently only vary the angular position of the gate 12 without affecting the angular position of the runner vanes 27. If the governor 22, however, continues the movement in the same direction to meet a major load increase resulting in a speed decrease, the contact 53 engages contact 52 of the pointer 48, thereby energizing the coil 63 of the electromagnetic switch 64 which closes to complete a circuit energizing the motor 33, which motor circuit includes windings 81 and 83 of thermal relay 62. If the load on the turbine decreases and the governor 22 causes movement of the servomotor 21 toward the right to tend to close the gate, the segment 46 will be moved in a clockwise direction to close the contacts 52 and 54, thereby energizing coil 68 of switch 69 which then closes to complete a circuit for energizing the motor through the windings 82 and 84 of thermal relay 67. After a predetermined time during which the motor circuit remains closed as when a foreign object blocks movement of the runner vanes or if the gearing fails to operate, the bimetallic elements of the several relays 62 or 67 open the circuit of the coils 63 or 68 and hence open the switches 64 or 69 which again interrupt the motor circuit.

During each of the above operations, a circuit is also completed from the middle phase of line 58 through slip ring 77, rheostat 36, slip ring 86, winding 87, and rheostat 88 to the bottom phase of line 58. The amount of rheostat 36 in circuit is dependent on the then position of the arm 37 and controls the positioning of pointer 48. The pointer therefore always indicates the relative positions of the gate and runner vanes.

Electrical means are provided with which the tilt of the runner vanes are indicated. A voltmeter 89 is mounted in shunt across the indicator winding 87 and in the circuit including the rheostat 36. The rheostat is constructed with steps of unequal resistance value for the reason that tilting in a steeper direction of the runner vanes 27 must be greater from half load to full load than from half load to zero load, whereas movement of the gate vanes 12 must be greater from zero load to half load than from half load to full load. That is, the ratio of runner vane movement to gate vane movement increases from half load to full load and decreases from half load to zero load. The scale of voltmeter 89 must accordingly be calibrated so that uniform movement of the pointer over the scale will give indications of the non-uniform movement of the runner vanes.

The series connected adjustable rheostat 88 is used to adjust the voltage across indicators 87 and 89 and rheostat 36 to constant value regardless of varying voltages on the line 58 which voltages are indicated by a voltmeter 90. The manually operable rheostat 88 may, of course, be replaced by any of the known types of voltage regulating devices to automatically keep the voltage across the rheostat 36 and indicators 87 and 89 at a predetermined or at a constant value, otherwise the indications will be incorrect.

The turbine may also be operated to run at a constant speed with fixed runner vane position if the switch 57 is left open, thus interrupting any circuit which would otherwise be completed by the pointer 48 with the contacts 53 and 54. It will also be understood that pushbuttons 91 or 92 may be used to vary the relation of the runner vane position to the gate vane position because such pushbuttons will energize operating coils 63 or 68, respectively, thus causing closing of the switches 64 or 69 to operate the motor 33. Operation of the pushbuttons 91 or 92 is possible at all times whether the turbine is running or is at rest, thus permitting adjustment of the runner vane position at all times.

A system of the character above described is adapted not only for local operation but may also be remotely controlled as desired. Such remote control means are shown in Fig. 3 in which pinion 49 is replaced by a pinion 93 which is provided with gear teeth to mesh with gear segment 46 and is also formed as a worm wheel to mesh with a worm 94. The worm 94 is driven by an electric motor 96 which may be operated from a suitable source of current indicated by battery 97 through pushbuttons 59 and 60. The motor 96 drives the arm of a rheostat 85 connected with a voltmeter 95 and operated through a worm 98 and a worm wheel 99. As motor 96 operates to vary the setting of runner vanes 27, the amount of rheostat 85 in circuit with voltmeter 95 is changed, therefore providing an indicator at all times of the setting of the runner vanes. The operation of motor 96 is controlled by pushbuttons 59 and 60 which are severally operable to cause rotation of motor 96 in opposite directions to provide either flat or steep tilt of runner vanes 27 as may be desired. The remainder of the vane adjusting system and the operation thereof is as described above and is therefore not again described.

Although but one embodiment of the present invention has been illustrated and described, it will be apparent from the above description, when read in connection with the following claims, that various changes and modifications may be made therein without departing from the spirit of the invention or from the scope of the appended claims.

It is claimed and desired to secure by Letters Patent:

1. In a control system for a fluid pressure operated turbine of the adjustable runner vane type, an electric motor for adjusting the runner vanes of the turbine, a movable gate controlling the flow of water to the turbine runner, a servomotor for operating the gate, a speed responsive governor for controlling the servomotor, a source of electric power for energizing the vane adjusting motor, a gear sector bearing a plurality of contacts and mechanically actuated by the governor, an independent contact engageable with said sector contacts, pairs of said contacts cooperating to control rotation of the motor in either direction, and means operated by the motor for returning the connections thereof to neutral.

2. In a control system for a fluid pressure operated turbine of the adjustable runner vane type, an electric motor for adjusting the runner vanes of the turbine, a movable gate controlling the flow of water to the turbine runner, a servomotor for operating the gate, a speed responsive governor for controlling the servomotor, a source of electric power for energizing the vane adjusting motor, a gear sector bearing a plurality of contacts, a rack and pinion actuated by the governor and engaging with said sector, an independent contact engageable with said sector contacts, pairs of said contacts operating to control rotation of the motor in either direction, and means operated by the motor for returning the connections thereof to neutral.

3. In a control system for a fluid pressure operated turbine of the adjustable runner vane type, an electric motor for adjusting the runner vanes of the turbine, a movable gate controlling the flow of water to the turbine runner, a servomotor for operating the gate, a speed responsive governor for controlling the servomotor, a source of electric power for energizing the vane adjusting motor, a gear sector bearing a plurality of contacts and mechanically actuated by the governor, an independent contact engageable with said sector contacts, a plurality of relays controlling the operation of the motor, said relays being controlled by pairs of said contacts for controlling operation of the motor in either direction, and means operated by the motor for returning the connections thereof to neutral.

4. In a control system for a fluid pressure operated turbine of the adjustable runner vane type, an electric motor for adjusting the runner vanes of the turbine, a movable gate controlling the flow of water to the turbine runner, a servomotor for operating the gate, a speed responsive governor for controlling the servomotor, a source of electric power for energizing the vane adjusting motor, a plurality of contacts actuated by the governor, a rheostat operated by the motor, a torque motor controlled by said rheostat, and an independent contact actuated by said torque motor and engageable with said contacts for controlling the rotation of the motor in either direction.

5. In a control system for a fluid pressure operated turbine of the adjustable runner vane type, an electric motor for adjusting the runner vanes of the turbine, a movable gate controlling the flow of water to the turbine runner, a servomotor for operating the gate, a speed responsive governor for controlling the servomotor, a source of electric power for energizing the vane adjusting motor, a plurality of contacts actuated by the governor, a rheostat operated by the motor, a torque motor controlled by said rheostat, a manually operable rheostat to adjust the action of said torque motor, and an independent contact actuated by said torque motor and engageable with said contacts for controlling the rotation of the motor in either direction.

6. In a control system for a fluid pressure operated turbine of the adjustable runner vane type, an electric motor for adjusting the runner vanes of the turbine, a movable gate controlling the flow of water to the turbine runner, a servomotor for operating the gate, a speed responsive governor for controlling the servomotor, a source of electric power for energizing the vane adjusting motor, a plurality of contacts actuated by the governor for controlling the motor, a rheostat operated by the motor, and means controlled by said rheostat for continuously indicating the position of the runner vanes.

7. In a control system for a fluid pressure operated turbine of the adjustable runner vane type, an electric motor for adjusting the runner vanes of the turbine, a movable gate controlling the flow of water to the turbine runner, a servomotor for operating the gate, a speed responsive governor for controlling the servomotor, a source of electric power for energizing the vane adjusting motor, a plurality of contacts actuated by the governor for controlling the motor, a rheostat operated by the motor, and a voltmeter controlled by said rheostat for indicating the position of the runner vanes.

8. In a control system for a fluid pressure operated turbine of the adjustable runner vane type, an electric motor for adjusting the runner vanes of the turbine, a movable gate controlling the flow of water to the turbine runner, a servomotor for operating the gate, a speed responsive governor for controlling the servomotor, a source of electric power for energizing the vane adjusting motor, a plurality of contacts actuated by the governor for controlling the motor, a rheostat operated by the motor, and a voltmeter controlled by said rheostat for indicating the position of the runner vanes, and means for maintaining a constant voltage in the circuit connected with the said voltmeter.

9. In a control system for a fluid pressure operated turbine of the adjustable runner vane type, an electric motor for adjusting the runner vanes of the turbine, a movable gate controlling the flow of water to the turbine runner, a servomotor for operating the gate, a speed responsive governor for controlling the servomotor, a source of electric power for energizing the vane adjusting motor, a plurality of contacts actuated by the governor for controlling the motor, a rheostat operated by the motor, and means interposed in the circuits of the motor for preventing continued overloading thereof.

10. In a control system for a fluid pressure operated turbine of the adjustable runner vane type, an electric motor for adjusting the runner vanes of the turbine, a movable gate controlling the flow of water to the turbine runner, a servomotor for operating the gate, a speed responsive governor for controlling the servomotor, a source of electric power for energizing the motor, a reversible motor for controlling the operation of the vane adjusting motor, an indicator operated by said motor for indicating the positions of the runner vanes, and a local circuit including a current varying means actuated by the vane adjusting motor, and a current responsive means in the circuit for returning the connections of the vane adjusting motor to neutral.

11. In a control system for a fluid pressure operated turbine of the adjustable runner vane type, an electric motor for adjusting the runner vanes of the turbine, a movable gate controlling the flow of water to the turbine runner, a servomotor for operating the gate, a speed responsive governor for controlling the servomotor, a source of electric power for energizing the vane adjusting motor, a plurality of contacts actuated by the governor, a rheostat operated by the motor, an electromotive device controlled by the rheostat, and an independent contact actuated by the electromotive device and engageable with the contacts for controlling the rotation of the motor in either direction.

12. In a control system for a fluid pressure operated turbine of the adjustable runner vane type, an electric motor for adjusting the runner vanes of the turbine, a source of electric power for energizing said motor, an oscillatable sector, a pair of contacts connected with said source of power and mounted on said sector, an independent contact engageable severally with each one of said pair of contacts for starting said motor, a rheostat operated by said motor, and an electromotive device in circuit with said rheostat for separating said independent contact from the one of said pair of contacts engaged therewith to stop said motor.

13. In a control system for a fluid pressure operated turbine of the adjustable runner vane type, an electric motor for adjusting the runner vanes of the turbine, a movable gate controlling the flow of water to the turbine runner, a servomotor for operating the gate, a speed responsive governor for controlling the servomotor, a reversible motor for controlling the operation of the vane adjusting motor, and a local circuit including means for starting the vane adjusting motor, a current varying means actuated by the vane adjusting motor, and current responsive means for returning the connections of the vane adjusting motor to neutral.

TERRYL B. MONTGOMERY.